Oct. 18, 1966   S. MITTY ETAL   3,279,811
CORRUGATED CARDBOARD SHOPPING CART
Filed Oct. 28, 1964   2 Sheets-Sheet 1
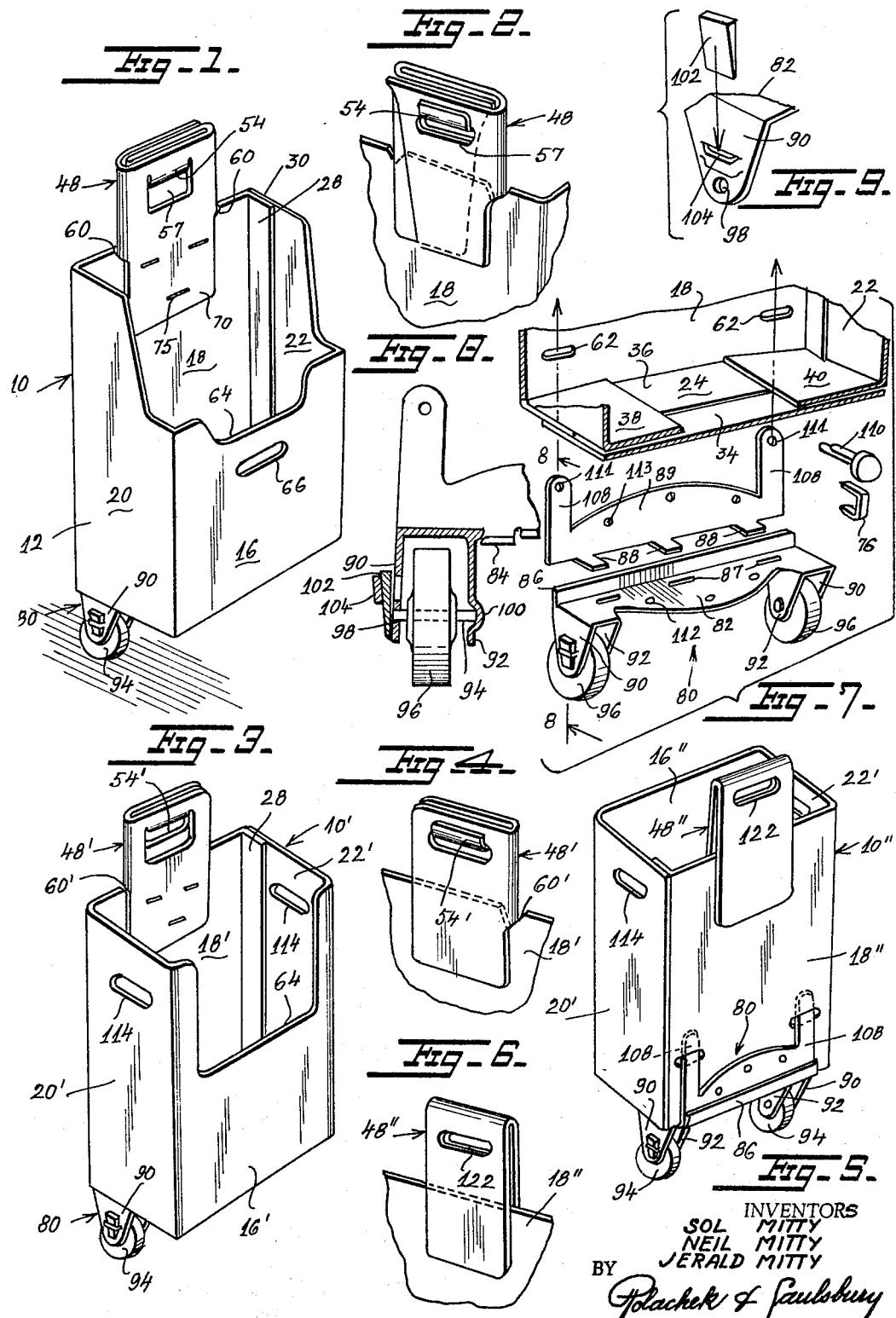

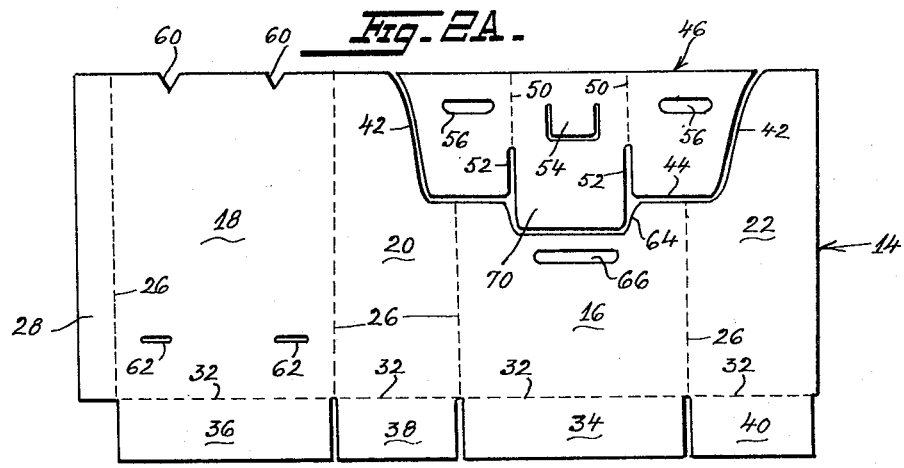
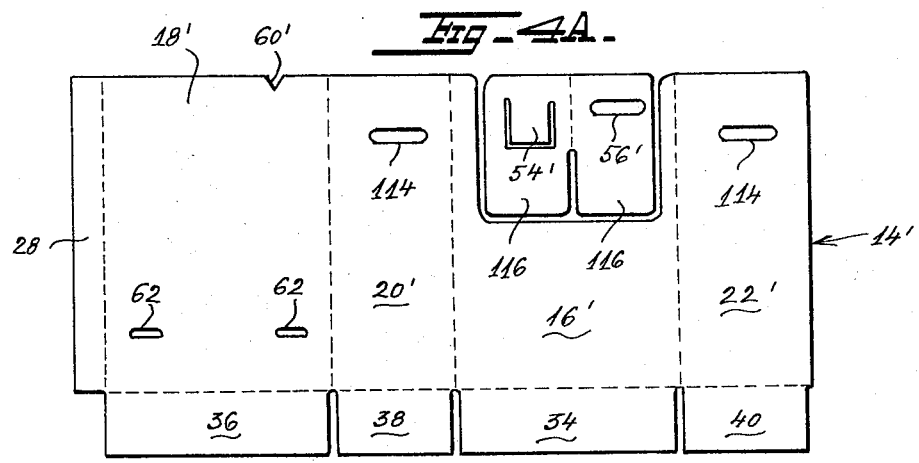
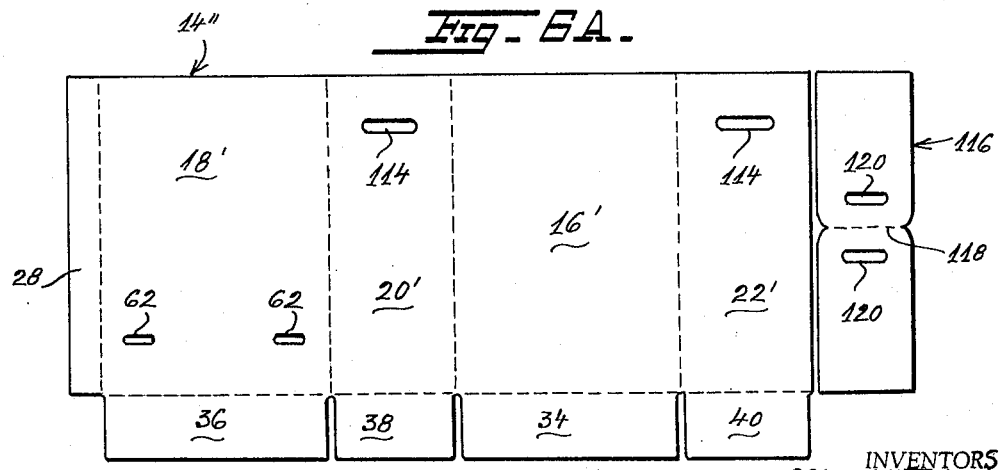

3,279,811
CORRUGATED CARDBOARD SHOPPING CART
Sol Mitty, Neil Mitty, and Jerald Mitty, all of 144—45 78th Ave., Flushing, N.Y.
Filed Oct. 28, 1964, Ser. No. 407,056
4 Claims. (Cl. 280—47.26)

This invention relates to new and useful improvements in shopping carts.

A principal object of the present invention is to provide a shopping cart, the body of which is formed of corrugated cardboard or paperboard.

Another object of the invention is to provide a shopping cart formed of cardboard or paperboard having a handle formed from the blank from which the body is formed to save material.

A further object of the invention is to provide a shopping cart with an improved wheel assembly.

Still another object is to provide a cardboard shopping cart that is simple in construction and economical to manufacture.

For further comprehension of the invention and of the objects and advantages thereof, reference may be had to the following description and accompanying drawings and to the appended claims in which the various novel features of the invention are more particularly set forth.

In the accompanying drawings forming a material part of this disclosure:

FIG. 1 is a perspective view of a shopping cart embodying one form of the invention.

FIG. 2 is an enlarged fragmentary perspective view of the cart showing the rear of the handle.

FIG. 2A is a top plan view of the struck blank from which the body of the cart of FIG. 1 is formed.

FIG. 3 is a view similar to FIG. 1 of a shopping cart embodying a modified form of the invention.

FIG. 4 is an enlarged fragmentary perspective view of the cart showing the rear of the handle.

FIG. 4A is a top plan view of the blank from which the body of the cart of FIG. 3 is formed.

FIG. 5 is a rear perspective view of a shopping cart embodying another modified form of the invention.

FIG. 6 is a fragmentary perspective view of a cart showing the front of the handle.

FIG. 6A is a top plan view of the blank from which the body of the cart of FIG. 5 is formed.

FIG. 7 is a fragmentary spread perspective view of the bottom structure of the cart and of the wheel assembly therefor that is common to all forms of the cart.

FIG. 8 is an enlarged vertical sectional view taken on the line 8—8 of FIG. 7 of wheel assembly.

FIG. 9 is a detail perspective view showing the wedge preparatory to the insertion of the wheel into the wheel support.

Referring now in detail to the various views of the drawings, in FIGS. 1 to 2A, inclusive, a shopping cart embodying the one form of the invention is shown and designated generally at 10. The cart 10 comprises a body 12 substantially rectangular in cross configuration and formed of cardboard or paperboard from a struck blank 14 shown in FIG. 2A. The body 12 has a front wall 16, a rear wall 18, side walls 20 and 22 and a bottom wall structure 24. The blank 14 is formed with fold lines 26 to form the wall portions and to form a side flap 28 on the rear wall 18 fastened to the inner surface of side wall 22 by adhesive 30 or staples if desired. The blank 14 is also formed with fold lines 32 to form the flaps 34 and 36 on the bottom of front and rear walls 16 and 18, respectively, and to form the flaps 38 and 40 on the bottom of the side walls 20 and 22 respectively.

The overlapped flaps 34, 36, 38, 40 constitute the bottom wall structure 24. The body 12 serves as a container for holding sundry articles obtained when shopping.

The struck blank 14 is also formed with slanting upright cut lines 42 continuing down into a horizontal cut line 44 to form a blank 46 for a foldable handle 48 for attachment of the body of the cart. The handle blank 46 is formed with transverse fold lines 50, 50 continuing into vertical cuts 52, 52 intersecting the horizontal cut line 44. The blank 46 is also formed with a cutout flap 54 between the fold lines 50, 50 and with closed slots 56, 56 between the fold lines 50 and slanting cut lines 42 in alignment with the base of the flap 54. The blank 46 when severed is folded along the fold lines 50, 50 and cut lines 52, 52 thereby forming the folder handle 48 with the slots 56, 56 in alignment with each other and with the flap 54. By inserting the flap 54 through the aligned slots 56, 56, a continuous opening 57 is provided forming a hand hole as seen in FIG. 2.

The rear wall 18 is formed with spaced notches 60, 60 in its top edge and with a pair of spaced slots 62, 62 adjacent its bottom end. The front wall 16 is formed with a recess 64 in its top edge and with a hand opening 66 slightly spaced below said recess 64.

The folder handle 48 is supported on the top edge of the rear wall 18 between the notches 60, 60, the top end of the rear wall being received betwen the extension 70 on the center section of the handle blank shown in FIG. 2A and the overlapped end sections thereof. The folded handle is secured in position on the rear wall 18 by staples 75. The cutting out of the blank 46 from the main blank 14 provides the front drop wall 16 with a height about half that of the rear wall 18 and provides the side walls 20 and 22 with cutway portions intersecting the top edge of the front wall. This construction facilitates the filling and emptying of the cart.

The body 12 of the cart is supported on a two part plastic wheel assembly 80 shown more in detail in FIGS. 7, 8 and 9. This plastic wheel assembly comprises an angular bracket part 82 having a horizontal flange portion 84 and a short vertical flange portion 86. The horizontal flange portion has three elongated openings 87 for receiving and retaining tongue projections 88 extending forwardly from the lower edge of a vertical plate part 89 and backed by the vertical flange portion 86 of the part 82 to a rigid composite assembly 80 adapted to be assembled upon the bottom wall structure 24. At each end portion, the horizontal flange is formed with closely spaced downwardly-extending integral V-shaped wheel-supporting flanges 90, 92. The flange 92 is closely spaced inwardly from the flange 90 and with said flange 90 constitutes a bearing support for a shaft 94 with a wheel 96 thereon. The shaft carries the wheel and is fixed in a hole 98 formed in the flange 90 and in a detent 100 formed in the plate 92 in line with the hole 98, as best seen in FIG. 4. The shaft 94 is held against displacement by means of a wedge 102 inserted through a loop 104 outstruck from the material of flange 90.

The vertical flange portion 86 of the bracket part 82 is also formed at each end with an elongated integral perforated finger 108 adapted to be extended tightly into holes 62 in rear wall 18 and secured against vertical displacement by staples 76 through holes 111 while other portions of the plastic parts 82 and 89 are secured to the bottom structure 24 by pin staples 110 entering in part through holes 112 and 113.

In assembling the cart 10, the rear portion of the bottom wall 24 of the body 12 is placed on the horizontal bracket part 82 with the fingers 108 of the vertical part 89 projecting through the slots 62 near the bottom of the rear wall 18 to the inside of the wall as best seen in FIG. 5. The horizontal and vertical parts are fastened in position by means of pin staples 110 inserted through the perforations in the lugs of said flanges and through the adjacent walls.

The flap 54 of the handle part 48 when inserted through the aligned slots 56 serves to interlock the folds of the folder handle 48, and the aligned slots and openings in the folds constitute a hand hole 57. The slot 66 in the front wall 16 also constitutes a hand hole.

In FIGS. 3 and 4, a modified form of shopping cart 10' is shown formed from a blank 14' of FIG. 4A. The cart 10' differs from the cart 10 in that the side walls 20' and 22' are not cut away and are formed with hand holes 114, 114, and no hand hole such as the hand hole 66 of FIG. 1 is shown in the front wall 16'.

Furthermore, in cart 10' the folder handle 48' is constructed differently consisting of only two-folded sections 116, 116 as seen in FIG. 4A. One section is provided with the closed slot 56' and the other section is provided with the cut out flap 54'. The rear wall 18' is provided with a single notch 60' alongside of which the folder handle 48' is mounted on the top of the rear wall. In all other respects, the cart 10' is similar to cart 10 and similar reference numerals are used to indicate similar parts, the bottom wheel assembly being the same and secured in the same manner as above described.

The modified form of shopping cart 10" shown in FIGS. 5 and 6 is somewhat the same as the shopping cart 10' of FIG. 3 except that the front wall 16" is imperforate without any recess and the rear wall 18" has no notches in the top edge thereof. Furthermore, the folder handle 48" is formed from an elongated rectangular strip 116 of cardboard cut from the edge of the blank 14" of FIG. 6A and bent along a fold line 118 midway its ends. The strip 116 is formed with slots 120 closely spaced from the fold line which align when the strip is folded and slipped over the top edge of rear wall 18" as shown in FIG. 6 to serve as the folder handle 48". The aligned slots 120 constitute a handle hole 122 for the folder handle.

In all forms of the invention, the cart is characterized by the economy in materials and labor required to fabricate the cart. It may be provided for one-time use or for several shopping trips. The cart will also have general household utility.

While we have illustrated and described the preferred embodiments of our invention, it is to be understood that we do not limit ourselves to the precise constructions herein disclosed and that various changes and modifications may be made within the scope of the invention as defined in the appended claims.

What is claimed is:

1. A shopping cart comprising a folded corrugated paperboard body of rectangular configuration constituting a container for sundry articles, said body having a front wall, a back wall, said back wall having spaced slots, side walls, and overlapping flaps defining a bottom wall, a two part wheel assembly secured to the bottom wall and bottom end of the back wall, said assembly comprising an angular bracket part having a horizontal flange engaging the bottom wall, a vertical flange part engaging the rear wall, means for detachably securing the bracket and flange parts together, fingers formed integrally with the ends of the vertical flange part, said fingers extending through the slots in the rear wall, closely spaced flanged bearings integrally depending from the end portions of the horizontal flange, shafts extending across the spaces between said wheel-supporting flanges, wheels rotatably mounted on said shafts between wheel-supporting flanges, and wedge-shaped means secured to one of the flanges for preventing displacement of the shafts.

2. A shopping cart comprising a folded corrugated paperboard body of rectangular configuration constituting a container for sundry articles, said body having a front wall, a back wall, said back wall having spaced slots, side walls, and overlapping flaps defining a bottom wall, a two part wheel assembly secured to the bottom wall and bottom end of the back wall, said assembly comprising an angular bracket part having a horizontal flange engaging the bottom wall, a vertical flange part engaging the rear wall, means for detachably securing the bracket and flange parts together, fingers formed integrally with the ends of the vertical flange part, said fingers extending through the slots in the rear wall, closely spaced flanged bearings integrally depending from the end portions of the horizontal flange, shafts extending across the spaces between said wheel-supporting flanges, and wedge-shaped means secured to one of the flanges for preventing displacement of the shafts, said means for securing the wheel assembly parts together comprising a vertical flange on the rear of the angular bracket part and transversely spaced slots, said vertical assembly part having tongue projections extending into said slots while engaging the vertical flange of the bracket part.

3. A wheel assembly for a shopping cart having a rectangular body with vertical side and rear walls and a horizontal bottom wall, said assembly comprising a bracket having an elongated angular body including a horizontal flange portion, a vertical plate part, closely spaced depending wheel-supporting flanges on the end portions of the horizontal flange, shafts and wheels supported by said wheel-supporting flanges, and fingers on the ends of the vertical plate part adapted to coact with slots in a container, the free edges of the horizontal flange and of the vertical plate part having spaced perforations for receiving fastening elements for fastening the assembly to a container.

4. A wheel assembly for a shopping cart having a rectangular body with vertical side and rear walls and a horizontal bottom wall, said assembly comprising a bracket having an elongated angular body including a horizontal flange portion, a vertical flange portion, closely spaced depending wheel-supporting flanges on the end portions of the horizontal flange portion, shafts and wheels supported by said wheel-supporting flanges, a vertical plate part, fingers on the ends of the vertical plate part adapted to coact with slots in a container, the free edges of the horizontal flange portion and of the vertical plate part having spaced perforations for receiving fastening elements for fastening the assembly to a container, said horizontal flange portion of the bracket having transversely-spaced slots, and tongue projections on the vertical plate part extending through the transversely-spaced slots of the horizontal flange portion of the bracket for interlocking the horizontal flange portion of the bracket to the vertical plate part.

References Cited by the Examiner

UNITED STATES PATENTS

| 1,507,663 | 9/1924 | Carley et al. | 280—79.2 |
| 2,478,563 | 8/1949 | Book | 280—47.17 X |
| 2,489,034 | 11/1949 | James | 229—52 |
| 3,087,740 | 4/1963 | Mitty et al. | 280—47.26 |
| 3,092,395 | 6/1963 | Mitty et al. | 280 |

BENJAMIN HERSH, *Primary Examiner.*

J. A. PEKAR, *Assistant Examiner.*